US012694853B2

(12) United States Patent
Bennett

(10) Patent No.: US 12,694,853 B2
(45) Date of Patent: Jul. 28, 2026

(54) SYSTEMS AND METHODS ASSOCIATED WITH A DRUMSTICK HOLDER

(71) Applicant: Chris Bennett, Austin, TX (US)

(72) Inventor: Chris Bennett, Austin, TX (US)

( * ) Notice: Subject to any disclaimer, the term of this patent is extended or adjusted under 35 U.S.C. 154(b) by 198 days.

(21) Appl. No.: 18/231,969

(22) Filed: Aug. 9, 2023

(65) Prior Publication Data

US 2024/0054978 A1 Feb. 15, 2024

Related U.S. Application Data

(60) Provisional application No. 63/396,662, filed on Aug. 10, 2022.

(51) Int. Cl.
*G10D 13/12* (2020.01)

(52) U.S. Cl.
CPC .................................... *G10D 13/12* (2020.02)

(58) Field of Classification Search
CPC ............. G10D 13/12; G10D 3/00; G10G 7/00
See application file for complete search history.

(56) References Cited

FOREIGN PATENT DOCUMENTS

GB 2506521 A * 4/2014 ............. G10D 13/12

* cited by examiner

*Primary Examiner* — Kimberly R Lockett
(74) *Attorney, Agent, or Firm* — Pierson IP, PLLC

(57) ABSTRACT

A drum stick holding system that is configured to be directly coupled to a drum, while reducing vibrations while holding the drum sticks.

7 Claims, 7 Drawing Sheets

SYSTEMS AND METHODS ASSOCIATED WITH A DRUMSTICK HOLDER

BACKGROUND INFORMATION

Field of the Disclosure

Examples of the present disclosure are related to systems and methods for a drumstick holder. More particularly, embodiments relate to a drum stick holding system that is configured to be directly coupled to a rim and curved surface of a drum while reducing vibrations of drumsticks positioned on the holder.

Background

A drumstick is a type of percussion mallet that is used for playing drums, and other percussion instruments. Generally drumsticks have a shaft and a tip, wherein drummers use the tip of the stick to strike the instrument. Different drumsticks may have different types of tips, such as cylindrical projections, mallets, brushes. When a drummer is playing the instrument, the drummer may drop the drum stick or wish to switch to a different type of drumstick.

However, conventional methods to store drumsticks while playing can be cumbersome. Conventionally cups or clips may be used to store drum sticks. These cups are generally molded in rigid plastic, and cover a large portion of the drumstick. This may reduce a surface area where a drummer can grasp the drumstick, or identify which drumstick they are grabbing. Additionally, when the drumsticks are positioned or being positioned within the cups, the drumsticks may rattle causing noise.

Alternatively, clips can be used to directly hold the drumsticks. These clips have grooves that are configured to receive and hold the drumsticks in place due to compressive forces. However, situations may arise where it is difficult to grasp and overcome the compressive forces to pull the drumstick away from the clip. Also, it can be difficult to remount drumsticks into the grooves without making an audible noise.

Accordingly, needs exist for more effective and efficient systems and methods for drumstick holders that allows a drummer to quickly and easily grasp a drumstick, and reposition the drumstick on the holder.

SUMMARY

Embodiments disclosed herein describe systems and methods associated with a drumstick holder. The drumstick holder system may be configured to be directly clipped onto a drum, simultaneously completely expose the shafts and tips of the drumstick, from the proximal end to the distal end of the shafts, to the drummers, while limiting vibrations of the drumsticks. The drumstick holder system may include a holder and at least one clip. The holder is configured to be coupled to the clip and the clip is configured to be directly coupled to the drum.

The holder may be a multitier device or tray that is configured to hold and secure drumsticks. The holder may include a first layer and a second layer. The first layer may be a plastic, or any other synthetic polymer. The second layer may be formed artificial leather, and be configured to be positioned over the first layer. The second layer may be configured to reduce vibrations from the second layer to the first layer, wherein a co-efficient of friction of the second layer may be greater than the first layer. The holder may include a first portion, second portion, and a plurality of coupling projections. The first portion and the second portion may be open ended concave curves, or parabolas that open upward, at different vertical offsets and different axial offsets from the clip. In embodiments, drumsticks may be simultaneously positioned on the first portion and the second portion.

The first portion may be positioned between a distal end of the holder and the second portion, wherein the first portion may have a first curve. The second portion may be positioned between the first portion and a proximal end of the holder, wherein the second portion may have a second curve. Additionally, the second curve of the second portion may be longer and taller than the first curve of the first portion.

In embodiments, the distal end of the holder may include a rear sidewall that extends across an entirety of the longitudinal axis of the first portion, wherein the rear sidewall may extend vertically upward. The rear sidewall may be configured to limit or restrict the rearward rolling of drumsticks positioned on the first portion. In embodiments, the first portion may be positioned at a larger vertical offset from a surface of the drum than the second portion, and the first portion may be positioned further away from the surface of the drum than the second portion.

In embodiments, the intersection of the first portion and the second portion may form a convex curve or a downward parabola that extends across an entirety of the longitudinal axis of the holder. The highest point of the convex curve may be vertically higher than a lowest point of the first and second curves. The convex curve may be configured to limit rearward rolling of drumsticks positioned on the second portion.

The coupling projections may be conically tapered projections, pegs, etc. extending away from a lower surface of the second portion of the holder. The coupling projections may be configured to be positioned into a coupling orifice positioned on a clip. The tapering of the projections may be configured to increase a contact surface area between the holder and the clip, which may limit vibrations. In embodiments, there may be a plurality of evenly spaced coupling projections positioned along the longitudinal axis of the second portion of the holder, wherein the coupling projections are aligned with the minimum vertical offset of the second portion. In embodiments, the projections may be positioned along the longitudinal axis of the second portion of the holder to maintain balance based on a stick weight when the drum sticks are positioned on the holder, while also ensuring that the proximal end of the holder does not extend onto the playing surface of the drum.

The clip may be a device that is configured to be coupled to a drum on one end, and the holder on a second end. The clip may include a front curve, tab, rear projection with coupling orifice, and an upper surface with a plurality of teeth.

The curved surface may be configured to be positioned under a rim of a drum, and provide a first contact point of the clip and the drum, and have a substantially "J" curve.

The tab may be a slanted projection that extends away from an outer surface of the curve. The tab may extend away at an angle away from the drum or proximal end of the front curve, which may enable a space to be formed between a front surface of the tab and the drum. In embodiments, a drummer may apply pressure away from the drum on the inner surface of the tab to increase a distance between the proximal end of the front curve and the upper surface of the clip. This may enable the clip to be easily removed from the drum.

The rear projection may be configured to extend away from an outer surface of the curved surface. The rear projection may also include the coupling orifice, wherein the coupling orifice is a tapered orifice that extends through a body of the rear projection. The tapering of the coupling orifice may cause a diameter across a top surface of the coupling orifice to be larger than a diameter across a bottom surface of the coupling surface. This may increase a surface area between the coupling projection and the coupling orifice to reduce vibrations.

The upper surface with the plurality of teeth may be configured to extend in a same direction as the curved surface, and be positioned over and directly adjacent to a rim of the drum. The upper surface may be configured to apply a compressive force towards the front end of the curved surface to secure the clip in place. In embodiments, a lower surface of the upper surface may include the plurality of teeth, wherein each of the plurality of teeth creates a different profile, indention, grooves, etc. within the upper surface. In embodiments, each of the plurality of teeth may be a different shape and/or size. This may enable the coupling of the clip to different sized rims of drums. Furthermore, when coupled to a rim of the drum, the upper surface may be upwardly angled with respect to a playing surface or face of the drum. This may allow the upper surface of the clip to not contact the playing surface of the drum.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
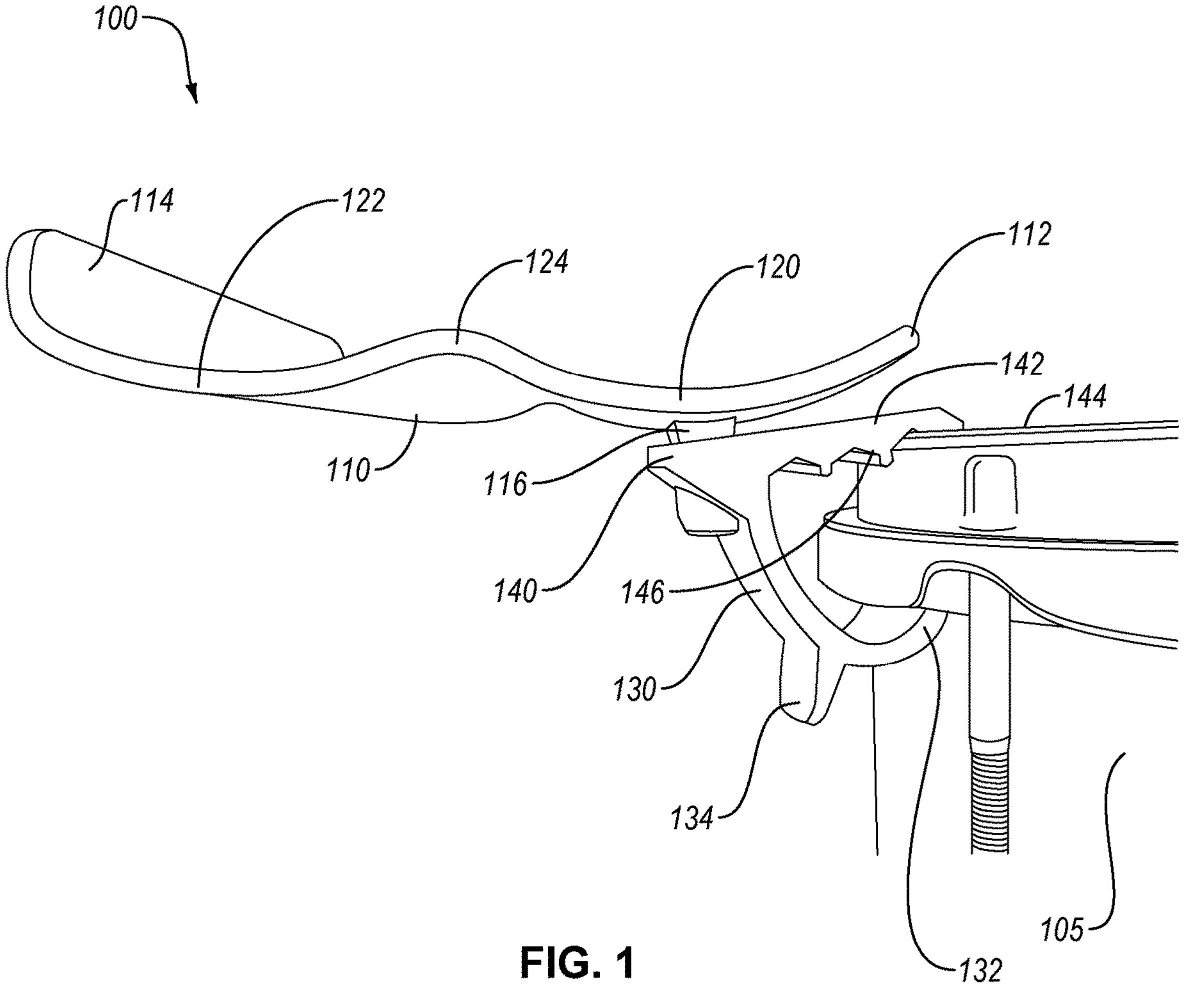
FIG. 1 depicts a drumstick holder system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

FIG. 1 depicts a drumstick holder system 100, according to an embodiment. Drumstick holder system 100 may be configured to be directly coupled to a drum 105 while limiting vibrations to surface of system 100. System 100 may include a holder 110 and at least one clip 130.

Holder 110 may be a multitier receptacle that is configured to hold drum sticks or other devices with a shaft, and holder 110 may be configured to be directly coupled to at least one clip 130. Holder 110 may include a first portion 122, second portion 120, and a plurality of coupling projections 116.

First portion 122 may be a first curve that is configured to receive and secure drumsticks. The first curve may be a concave curve with a first length and a first height. The first curve may extend from a distal end 114 of holder 100 to a convex curve 124. The first curve may have open left and right ends. This may allow a user to position drumsticks along the longitudinal axis of the first curve, wherein the drumsticks may have a longer length than the longitudinal axis allowing both the top and bottom ends of the drumsticks to not be positioned on the curve. Therefore, the first end and the tip of the drumsticks may be completely exposed if positioned on first portion 122. A minimum vertical offset of the first curve may be a first vertical distance from the plurality of coupling mechanisms 116. Distal end 114 may be a rear sidewall that extends across an entirety of the longitudinal axis of the first portion 122, wherein the rear sidewall may extend vertically upward. The rear sidewall may be configured to limit or restrict the rearward rolling of drumsticks positioned on the first portion 122.

Second portion 120 may be a second curve that is configured to receive and secure drumsticks. The second curve may be a concave curve with a second length and a second height. In embodiments, the second length may be the same as the first height, but the second height may be greater in length than the first height. The first curve may have open left and right ends. The second curve may have open left and right ends. This may allow a user to position drumsticks along the longitudinal axis of the second curve, wherein the drumsticks may have a longer length than the longitudinal axis allowing both the top and bottom ends of the drumsticks to not be positioned on the second curve. Therefore, the first end and the tip of the drumsticks may be completely exposed if positioned on second portion 120. A minimum vertical offset of the second curve may be a second vertical distance from the plurality of coupling projections 116. As such, a vertical offset of the second curve may be closer to coupling projections 116 than the vertical offset of the first curve. In embodiments, the first portion 122 may be positioned at a larger vertical offset from a surface of the drum than the second portion 120, and the first portion 122 may be positioned axially further away from the surface of the drum than the second portion 120. The first curve may extend from convex curve 124 to a proximal end 112 of holder 110.

Convex curve 124 may be formed at an intersection of the first portion 122 and the second portion 120 that forms a downward parabola curve. Convex curve 124 may extend across an entirety of the longitudinal axis of the holder 110. The highest point of the convex curve may be vertically higher than a lowest point of the first curve and second curves. The convex curve 124 may be configured to limit rearward rolling of drumsticks positioned on the second portion 120.

Coupling projections 116 may be conically tapered projections extending away from a lower surface of second portion 122 of holder 110, wherein an upper diameter of coupling projections 116 is larger than a lower diameter of coupling projections 116. Coupling projections 116 may be configured to be positioned into a coupling orifice positioned on clip 130. The tapering of the coupling projections 116 may be configured to increase a surface area of contact between the holder 110 and clip 130, which may limit vibrations. In embodiments, there may be a plurality of evenly spaced coupling projections 116 positioned along the longitudinal axis of the second portion 120, wherein each of the coupling projections 116 are aligned with the minimum vertical offset of the second portion 120.

Clip 130 may be a device that is configured to be coupled to a drum on one end, and the holder on a second end. Clip 130 may include a front curve 132, tab 134, rear projection 140 with coupling orifice, and an upper surface 142 with a plurality of teeth 144.

Front curve 132 may be configured to be positioned under a rim of a drum, and provide a first contact point of the clip and the drum, and have a substantially "J" curve. Front curve 132 may be configured to increase the distance between upper surface 142 and front curve 132 to allow a rim of a drum to be positioned over front curve 132, and then apply a compressive force against the rim of the drum.

Tab 134 may be a slanted projection that extends away from an outer surface of front curve 132. Tab 134 may extend away at an angle away from the drum or proximal end of the front curve 132, which may enable an increasing space to be formed between a front surface of tab 134 and the drum. In embodiments, a drummer may apply pressure away from the drum on the inner surface of tab 134 to increase a distance between the proximal end of the front curve 132 and the upper surface 142 of the clip. This may enable clip 130 to be removed from and positioned on the drum.

Rear projection 140 may be configured to extend away from an outer surface of front curve 132. Rear projection 140 may also include the coupling orifice, wherein the coupling orifice is a tapered orifice that extends through a body of the rear projection 140. The tapering of the coupling orifice may cause a diameter across a top surface of the coupling orifice to be larger than a diameter across a bottom surface of the coupling surface. This may increase a surface area between the coupling projection and the coupling orifice to reduce vibrations.

Upper surface 142 with a plurality of teeth 144 may be configured to extend in a same direction as the curved surface, and be positioned over and directly adjacent to a rim of the drum. Upper surface 142 may be configured to apply a compressive force towards the front end of the curved surface 132 to secure the clip 130 in place. In embodiments, a lower surface of the upper surface may include a plurality of teeth 144, wherein each of the plurality of teeth creates a profile, indention, grooves, etc. within the upper surface. In embodiments, each of the plurality of teeth 144 may be have a different profile, shape and/or size. This may enable the coupling of the clip to different sized rims of drums. Furthermore, when coupled to a rim of the drum, the upper surface 142 may be upwardly angled with respect to a playing surface or face of the drum. This may allow the upper surface 142 the clip to not play the playing surface of the drum.

Figure 2:
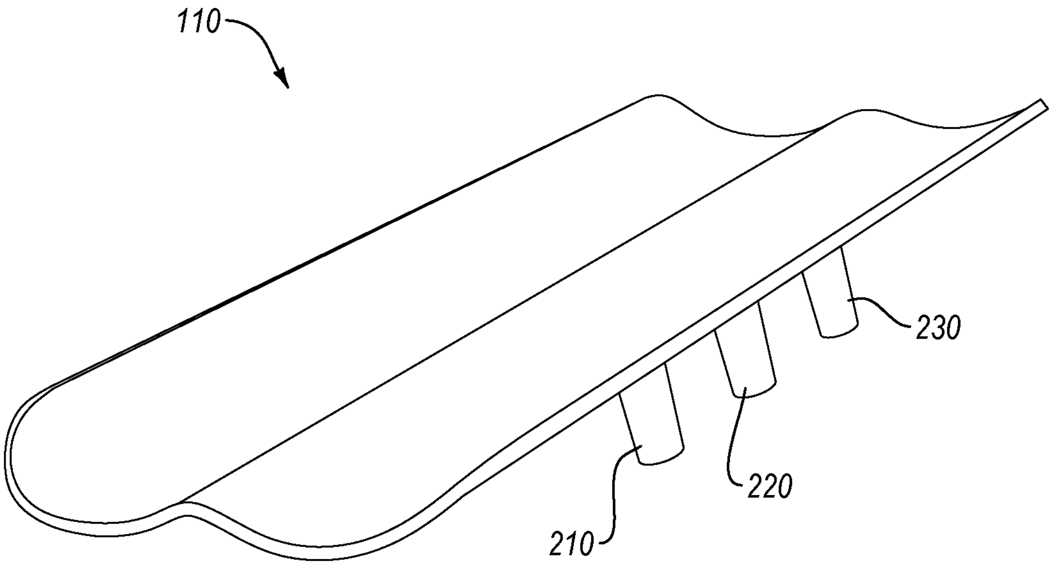
FIG. 2 depicts a holder, according to an embodiment.

FIG. 2 depicts holder 110, according to an embodiment. Elements depicted in FIG. 2 may be described above, and for the sake of brevity a further description of these elements may be omitted.

As depicted in FIG. 2, holder may include a plurality of coupling projections 210, 220, 230. Each of the coupling projections 210, 220, 230 may be the same size and shape and may be aligned on a same axis.

Figure 3:
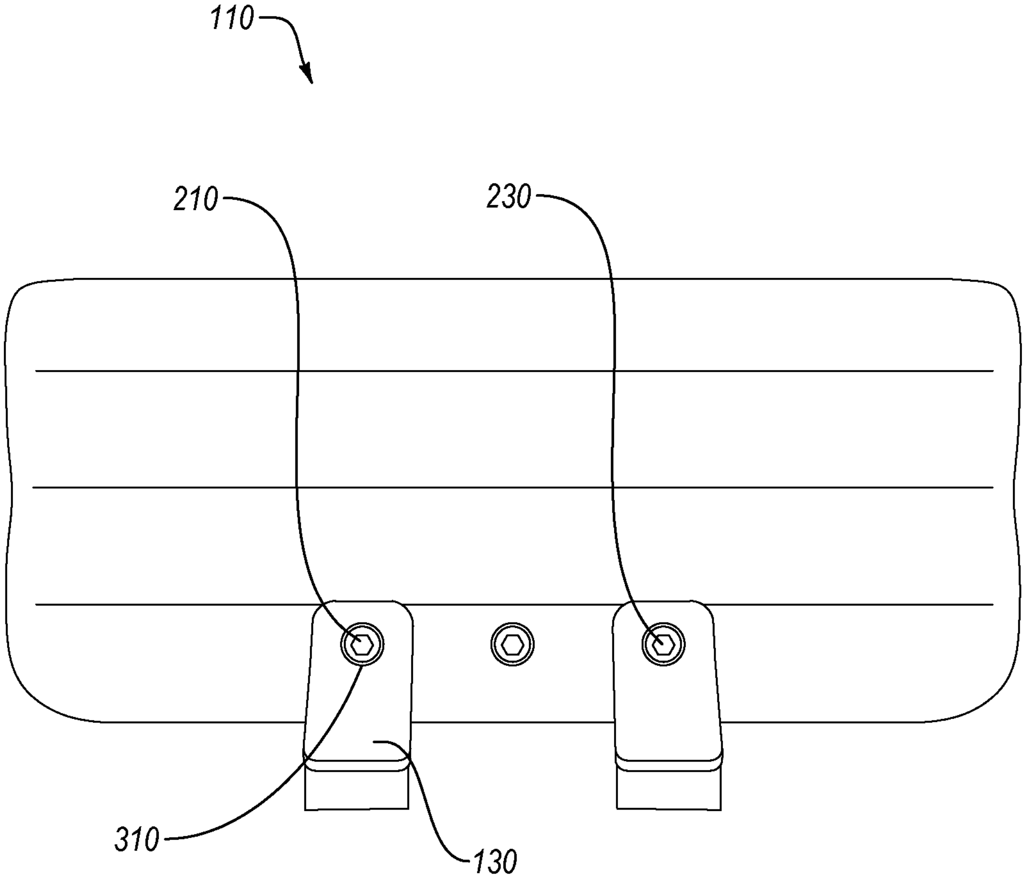
FIG. 3 depicts a plurality of clips coupled to different coupling projections, according to an embodiment.

FIG. 3 depicts a plurality of clips 130 coupled to different coupling projections 210, 230, according to an embodiment. This may rotationally lock clips 130 and holder 110, such that holder 110 cannot be rotated when coupled to the drum. Elements depicted in FIG. 3 may be described above, and for the sake of brevity a further description of these elements may be omitted.

As depicted in FIG. 3, coupling projections 210 may be configured to extend through coupling orifices 310 to couple clip 130 with holder 110. In other embodiments, a single clip 130 may be coupled to a single coupling projection 210, 220, 230, which may enable holder 110 to swivel.

Figure 4:
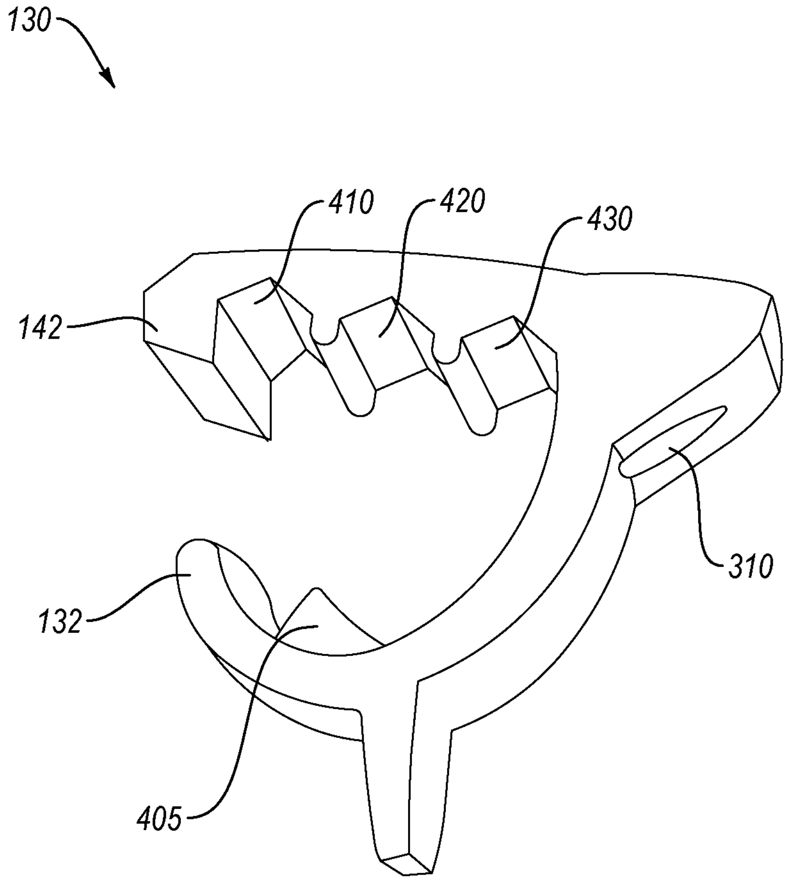
FIG. 4 depicts a clip, according to an embodiment.

FIG. 4 depicts a clip 130, according to an embodiment. Elements depicted in FIG. 4 may be described above, and for the sake of brevity a further description of these elements may be omitted.

As depicted in FIG. 4, the plurality of teeth may each have a different profile, which may assist in clamping clip 130 to different rims of instruments. For example, a front tooth 410 may have a first depth, second tooth 420 a second depth, and third tooth 430 may have a third depth, wherein the first, second, and third teeth are decreasing in size. In embodiments, front tooth 410 may have the largest depth. This may enable clip 130 to be positioned on a larger rim on a position that if furthers away from coupling orifice 310.

Furthermore, front curve 132 may include an inner projection 405, which is configured to apply pressure against the lower surface of the drum to secure the clip 130 in place. Inner projection 405 may be configured to apply another contact point between the rim of the drum and clip 130. Inner projection 405 may be positioned below and behind a proximal end of front curve 132. This relative geometry may enable front curve 132 to not touch the shell of the drum while inner projection 405 contacts the rim of the drum.

Figure 5:
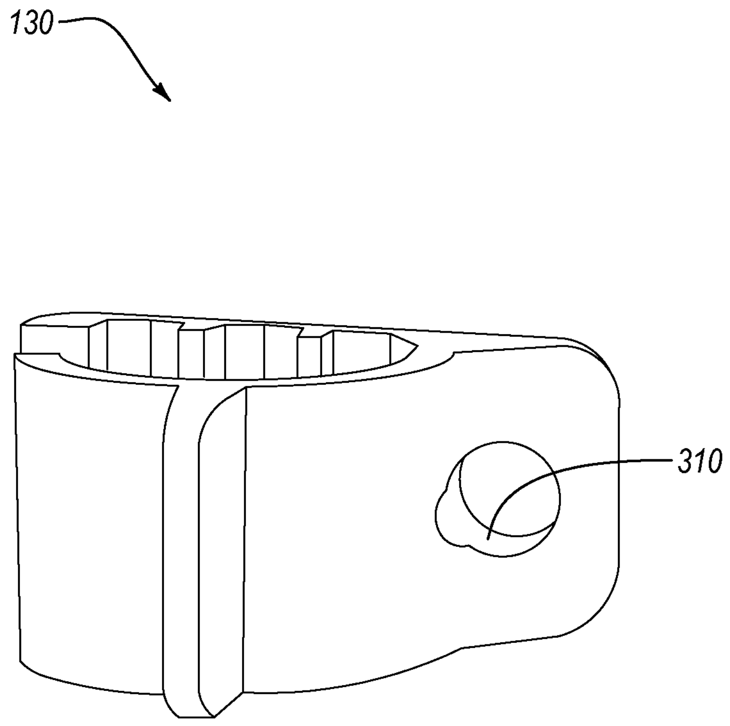
FIG. 5 depicts a clip, according to an embodiment. Elements

FIG. 5 depicts a clip 130, according to an embodiment. Elements depicted in FIG. 5 may be described above, and for the sake of brevity a further description of these elements may be omitted.

As depicted in FIG. 5, coupling orifice 510 may be tapered such that a first end of coupling orifice 510 has a larger diameter than that of a second end of coupling orifice 510.

Figure 6:
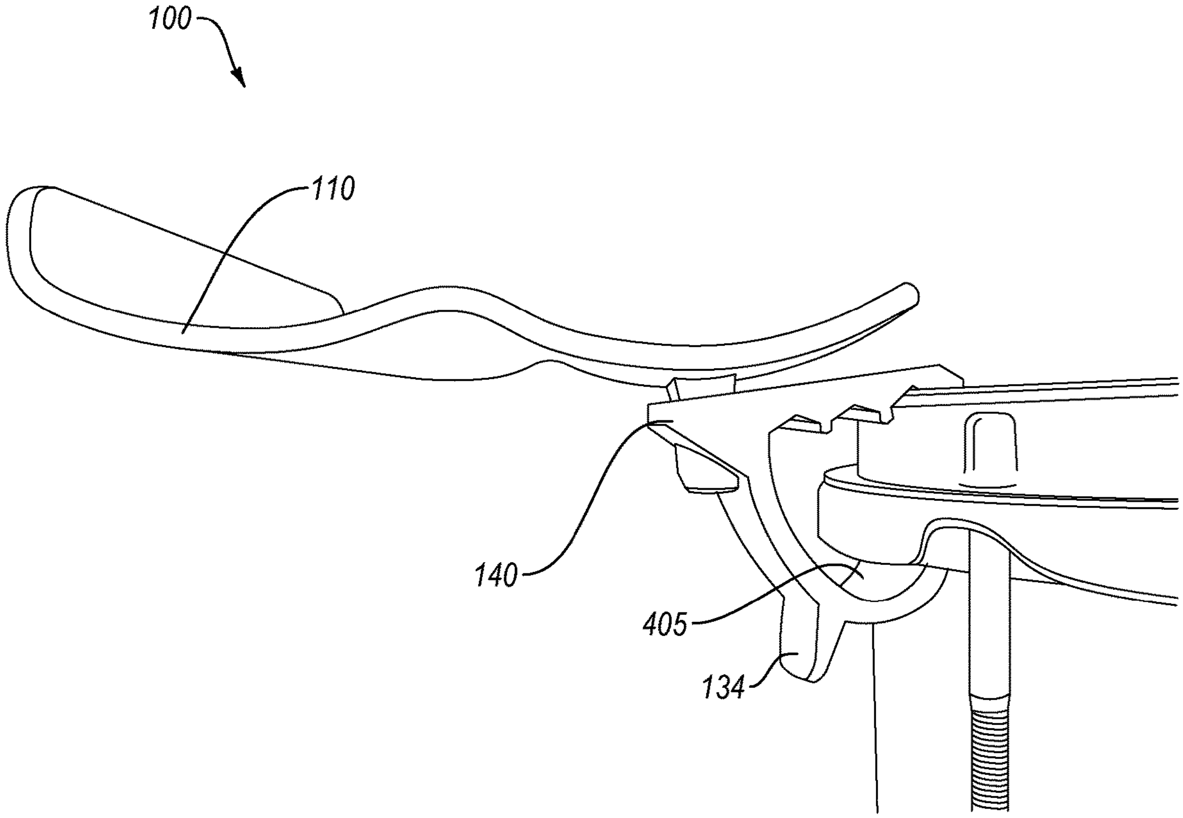
FIG. 6 depicts a drumstick holder system, according to an embodiment.

FIG. 6 depicts a drum stick holder system 100, according to an embodiment. Elements depicted in FIG. 6 may be described above, and for the sake of brevity a further description of these elements may be omitted.

As depicted in FIG. 6, inner projection 405 may be utilized to be positioned directly under a rim of a drum to provide an extra contact point for clip 130, which may limit vibrations.

Figure 7:
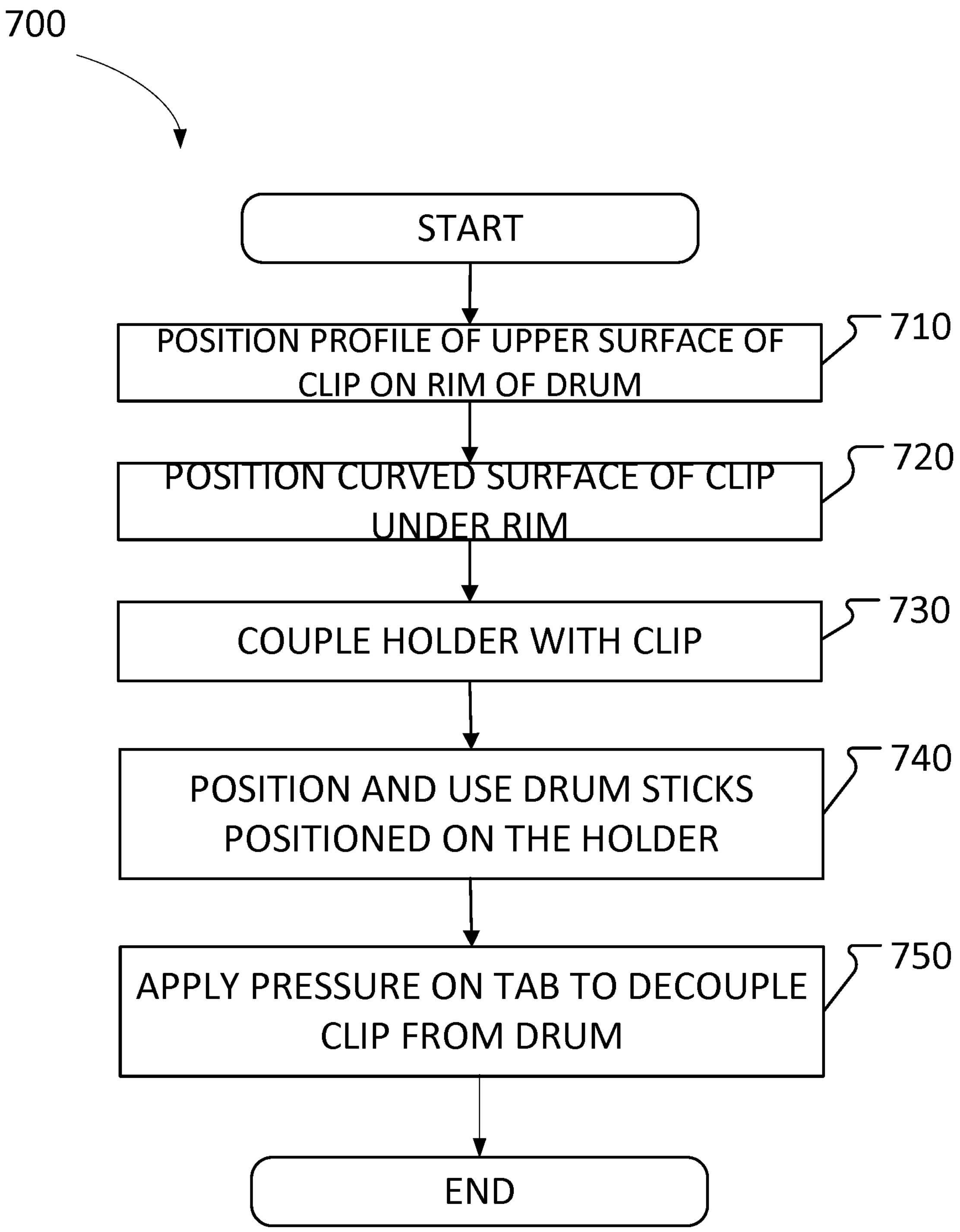
FIG. 7 illustrates a method for operating drum stick holder system, according to an embodiment.

FIG. 7 illustrates a method 700 for operating drum stick holder system, according to an embodiment. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

At operation 710, an inner profile on an upper surface of a clip may be positioned over a rim of a drum or other instrument. The inner profile may be selected from a plurality of profiles on an inner surface of the upper surface of the clip, wherein the plurality of profiles have different depths, widths, and tapering.

At operation 720, a force may be applied to a front end of a curved surface extending away from the upper surface of the clip, and positioned under a rim of the drum of other instrument. Responsive to removing the force, the curved surface and the upper surface may apply compressive forces towards each other to secure the clip to the instrument.

At operation 730, a coupling projection on a holder may be inserted into a coupling orifice on the clip. This may couple the holder and the clip together.

At operation 740, drum sticks may be positioned and removed from the holder.

At operation 750, a pressure away from the drum or instrument may be applied against an inner surface of a tab, wherein the tab is positioned on an external surface of the curved surface of the clip. This may increase a distance between the front end of the curved surface and the upper surface of the clip. Due to the increase in distance, the clip may be easily removed from the drum or other instrument in a same direction as the pressure applied against the inner surface of the tab.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to “one embodiment”, “an embodiment”, “one example” or “an example” means that a particular feature, structure or characteristic described in connection with the embodiment or example is included in at least one embodiment of the present invention. Thus, appearances of the phrases “in one embodiment”, “in an embodiment”, “one example” or “an example” in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A system for holding drumsticks comprised of:

a holder that includes a first portion and a second portion, the first portion including a first upward parabola, the second portion including a second upward parabola, the first upward parabola being positioned at a different vertical offset and a different axial offset from the second upward parabola, the holder including a downward parabola positioned axially between the first portion and the second portion.

2. The system of claim 1, wherein a width of the first portion and second portion is equal, and the width is shorter than a length of a standard drumstick.

3. The system of claim 1, further comprising:

coupling projections positioned on a lower surface of the second portion of the holder, the coupling projections having a tapered outer diameter.

4. A system for holding drumsticks comprised of:

a holder that includes a first portion and a second portion, the first portion including a first upward parabola, the second portion including a second upward parabola, the first upward parabola being positioned at a different vertical offset and a different axial offset from the second upward parabola;

a clip with a coupling orifice, the coupling orifice being configured to receive a first of the coupling projections to secure the holder to a drum, wherein the clip includes a front curve and a rear projection, wherein the coupling orifice is positioned on the rear projection and the front curve is configured to apply compressive forces against the drum.

5. The system of claim 4, further comprising:

an inner projection positioned on an inner surface of the front curve, the inner projection being configured to contact a rim of the drum.

6. The system of claim 5, further comprising:

a plurality of teeth positioned on an upper surface of the front curve, each of the plurality of teeth having a different profile and being configured to contact the rim of the drum.

7. The system of claim 1, wherein the first upward parabola and second upward parabola are different curves.

* * * * *